Figure 1:
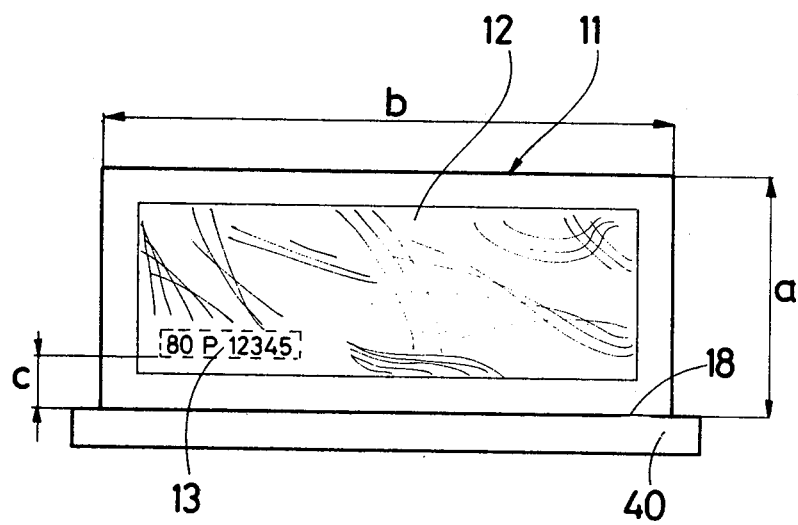

United States Patent [19]

Kuehfuss

[11] Patent Number: 4,463,677
[45] Date of Patent: Aug. 7, 1984

[54] METHOD AND APPARATUS FOR THE MANUFACTURE OF FRESHLY PRINTED, NUMBERED SECURITY PAPERS CUT TO FORMAT

[75] Inventor: Runwalt Kuehfuss, Metzingen, Fed. Rep. of Germany

[73] Assignee: De La Rue Giori SA, Switzerland

[21] Appl. No.: 480,071

[22] Filed: Mar. 29, 1983

[30] Foreign Application Priority Data

Apr. 8, 1982 [CH] Switzerland ............... 2195/82

[51] Int. Cl.³ .................................... B41J 45/00
[52] U.S. Cl. ............................. 101/426; 101/72; 270/1.1; 270/21.1; 270/58; 83/371
[58] Field of Search ............ 270/1.1, 18, 21.1, 58; 101/72–73, 70, 93.07, 226–227, 237, 238, 248, 426; 235/379, 432, 433; 194/16.26; 83/371; 493/2, 424; 209/3.3

[56] References Cited

U.S. PATENT DOCUMENTS

| | | | |
|---|---|---|---|
| 3,833,795 | 9/1974 | Shoshan et al. | 101/72 |
| 3,988,015 | 10/1976 | Scantlin | 270/1.1 |
| 4,013,006 | 3/1977 | Burrell et al. | 101/73 |
| 4,034,973 | 7/1977 | Hams | 270/58 |
| 4,177,730 | 12/1979 | Schriber et al. | 101/426 X |
| 4,338,768 | 7/1982 | Ballestra et al. | 209/3.3 |
| 4,366,753 | 1/1983 | Glanz et al. | 101/227 |
| 4,381,107 | 4/1983 | Armiger | 270/21.1 X |

Primary Examiner—E. H. Eickholt
Attorney, Agent, or Firm—Kane, Dalsimer, Kane, Sullivan and Kurucz

[57] ABSTRACT

Finished printed sheets of security papers (10) are numbered in a numbering machine (21), to whose numbering units (21b) additional blocks are attached, which at a constant, predetermined distance from the printed number, print a cutting mark associated with the respective security paper, on an edge of the sheet which is subsequently cut off. At the time of subsequent cutting of the pile of sheets into strips, these cutting marks define those cutting edges which represent the reference edges of the security papers determining the exact reading position, at the time of subsequent automatic reading of the number of the security papers in circulation. For this purpose, the cutting marks are read by a reading unit (28) located on the strip-cutting unit (27), which unit (28) controls the feed device (26) moving the pile of sheets successively into the cutting positions. In this way it is ensured that the distance between the position of the number to be read and the reference edge of a security paper, which is critical for reliable automatic reading of the numbers, remains virtually constant for all security papers, irrespective of all possible tolerances occurring in the processing of sheets to produce finished, cut security papers.

9 Claims, 5 Drawing Figures

METHOD AND APPARATUS FOR THE MANUFACTURE OF FRESHLY PRINTED, NUMBERED SECURITY PAPERS CUT TO FORMAT

The invention relates to a method according to the abstract and to an apparatus for carrying out the method.

In the manufacture of security papers, in particular of bank-notes, in general sheets of security papers with a certain number of units, that is to say with a certain number of security paper impressions arranged in the form of a matrix are first of all produced, then the security paper impressions on the sheet are numbered in a numbering machine and finally the sheets in the form of a stack are cut step by step into layers of strips and then the layers of strips are cut into security paper bundles, in which case the individual security papers of the bundle obtain their finished format. When using cutting machines operating automatically, the feed lengths during step-wise feeding of the pile of sheets and of the layers of strips are fixed respectively on the basis of a feed programme set once and in particular depending on the size of the security paper or the desired format of the security paper.

At the time of subsequent controlling of the security papers, in particular in the case of authenticity checks of bank-notes in circulation, it is desirable or even frequently prescribed that the numbers of the security papers, i.e. in the case of bank-notes the serial numbers, are read and controlled. In many countries, for this purpose, as soon as they have been paid into a bank, bank-notes in circulation are sent to the respective central bank, where they are checked for authenticity and for their degree of wear. This authenticity check generally includes the reading and recording of the serial numbers. On average, each bank-note in circulation arrives approximately five to six times for checking and reading of the numbers in the central bank, before it is withdrawn from circulation on account of excessive wear.

Today there is an increasing requirement to carry out this reading of the numbers automatically with suitable number-reading units, which generally operate optically on the basis of digit recognition. For this purpose it is naturally necessary that the numbers are printed in a form suitable for automatic reading. Automatic reading units operating according to other methods, for example magnetic number-reading units, can also be used, insofar that solely the printed number or the number ink has specific properties which can be recognised by the detector of the reading unit.

Now troublefree and reliable automatic reading of numbers depends not solely on the fact that the numbers can be recognised clearly by the number-reading unit, but also on the exact reading position, which the number must assume at the instant of reading relative to the number-reading unit or on passing the number-reading unit, in order that the entire region of the number is completely covered. In this case, since in general the admissible tolerances are very close, then hitherto incorrect readings occurred if the position of the number at the time of reading is shifted or displaced only slightly, for example by only several tenths of a millimeter, with respect to the prescribed reading position. In general a tolerance of 0.5 mm maximum is the utmost limit still acceptable for reliable automatic reading.

The security paper number generally appears at several points of the security paper. For the purpose of automatic reading one appropriately chooses a number printed in the vicinity of the edge or corner, in which case the adjacent edge of the security paper, which preferably extends parallel to the reading direction of the number and is formed by the lower broad side edge, is used as a reference edge, which bears against a positioning stop during reading of the number. Normally this positioning stop is arranged horizontally and forms a support for the vertical security papers to be read, which are supported by their reference edge on this support, whilst the reading takes place in the horizontal direction at a height which corresponds to the distance of the position of the number from the reference edge. Now it is this very distance, which is important for correct reading of the number, which in practice varies to a greater or lesser extent from security paper to security paper, in particular from bank-note to bank-note, in which case the tolerances occurring may be greater than approximately 0.5 mm.

These variations of the position of the number relative to the reference edge are based on the inevitable tolerances which are related to the differences in format of the sheets of security papers, with the compression and elongation of the paper at the time of printing and with its moisture content, with inaccuracies of the register at the time of printing the number and with inaccuracies at the time of cutting the pile of sheets and layers of strips.

The aforedescribed effects hitherto jeopardized reliable automatic reading of numbers, so that reading of this type could not generally succeed, although its advantages in contrast to visual reading by suitably trained personnel are obvious.

The object of the invention is to develop the production of security papers which are numbered and cut to format so that despite the aforementioned tolerances, the number intended for automatic reading always has a sufficiently accurate position relative to the reference edge of the security paper.

This object is achieved according to the invention by the features described in the characterising part of patent claim 1 and, as regards the apparatus for carrying out the method according to the invention, by the features described in patent claim 7.

Thus, for each security paper, a constant distance between the position of the number and the reference edge is guaranteed, because the block printing the cutting mark is attached to the numbering unit cylinder at a predetermined distance from the respective numbering unit and is preferably located on the numbering unit itself or, if the distance is greater, on the numbering unit support.

In the simplest manner, the control of the feed at the time of cutting the strips can be carried out in that a side edge of the sheets arranged parallel to the feed direction of the pile of sheets at the time of cutting the strips, which side edge is cut off at the time of subsequent trimming, is provided with the cutting marks during numbering. In this case, a cutting mark respectively defines the reference edges of all security papers located in a row of security papers, that is to say one cutting line when cutting the strips.

If one uses intermediate cuts when cutting the pile of sheets, the cutting marks may naturally be applied to the subsequent waste strips between adjacent rows of security papers. Cutting whilst using intermediate cuts guarantees that all the resulting security papers have the same predetermined format, since only the possibly varying widths of the waste or intermediate strips are controlled by the cutting marks, but the width of the layers of strips itself is determined by permanently programmed, constant feed steps.

In principle, the feed control according to the invention can also be used for cutting the bundles. However, since no edge arranged parallel to the feed direction and which is cut off later, is available for the cutting marks and additional marks printed on the security paper, as represented by the cutting marks, are generally not admissible, then when cutting the bundles, one must work with intermediate cuts, in order to be able to apply the cutting marks to the waste strips.

Appropriate embodiments of the invention are described in the dependent patent claims.

Figure 2:
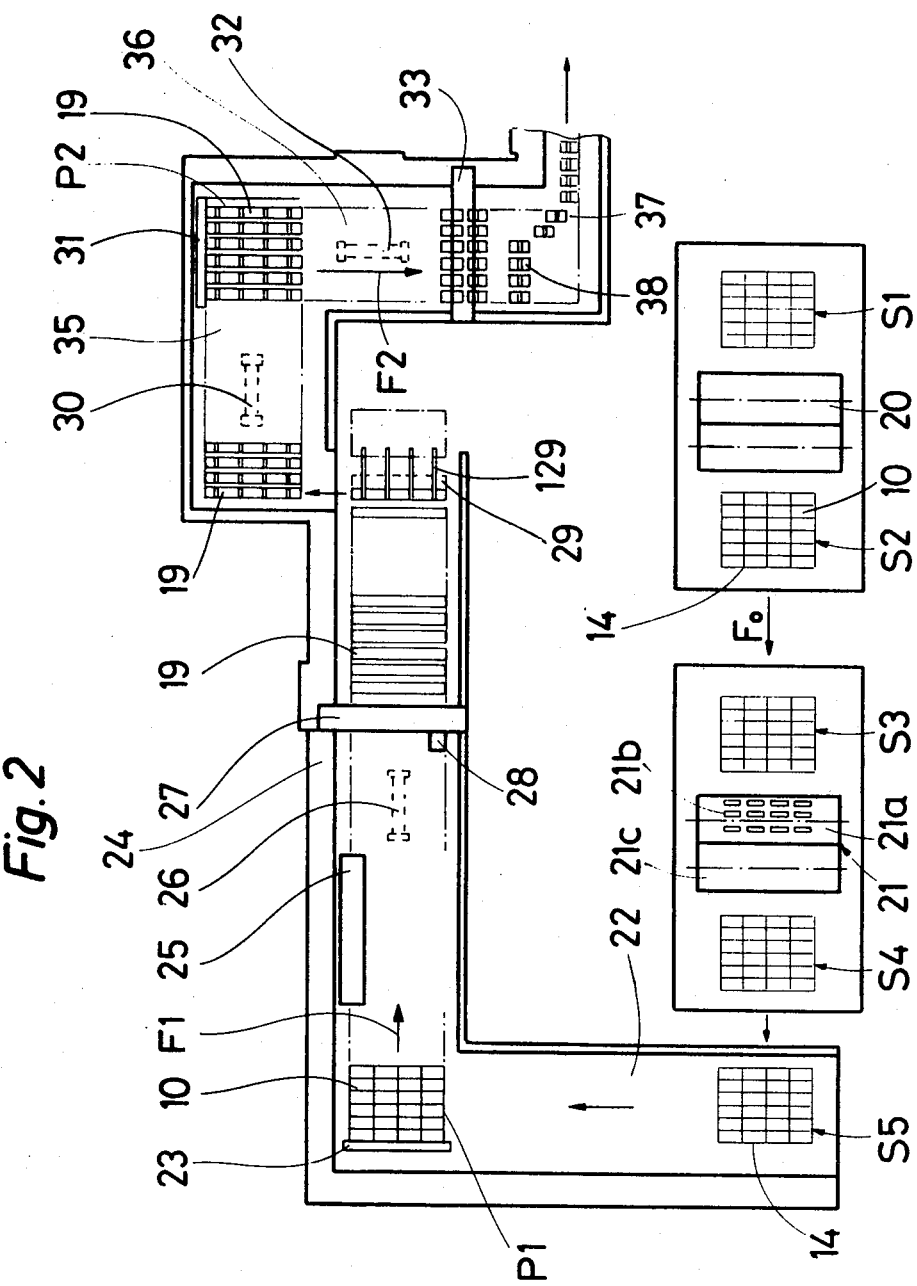
Figure 3:
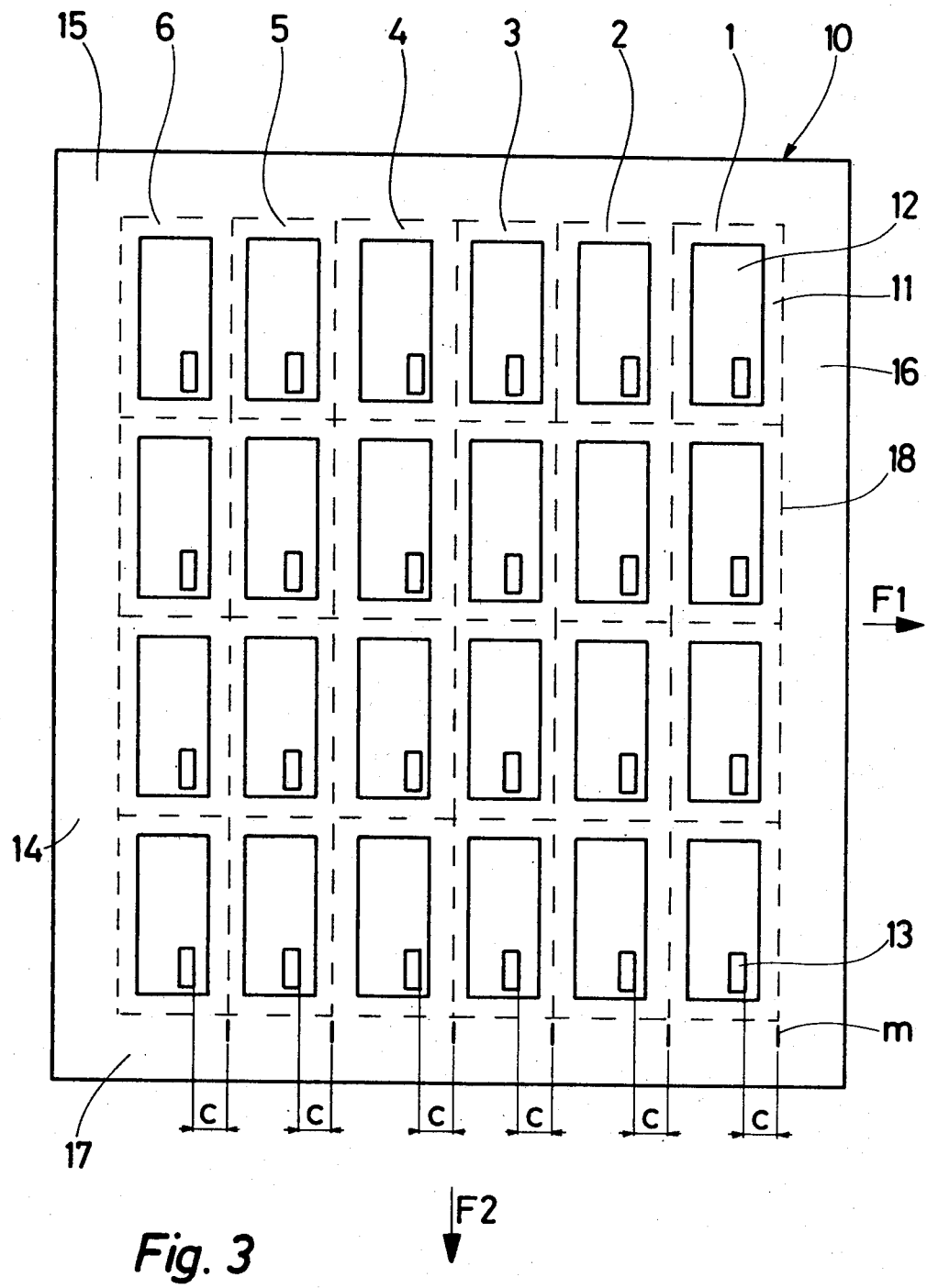
Figure 4:
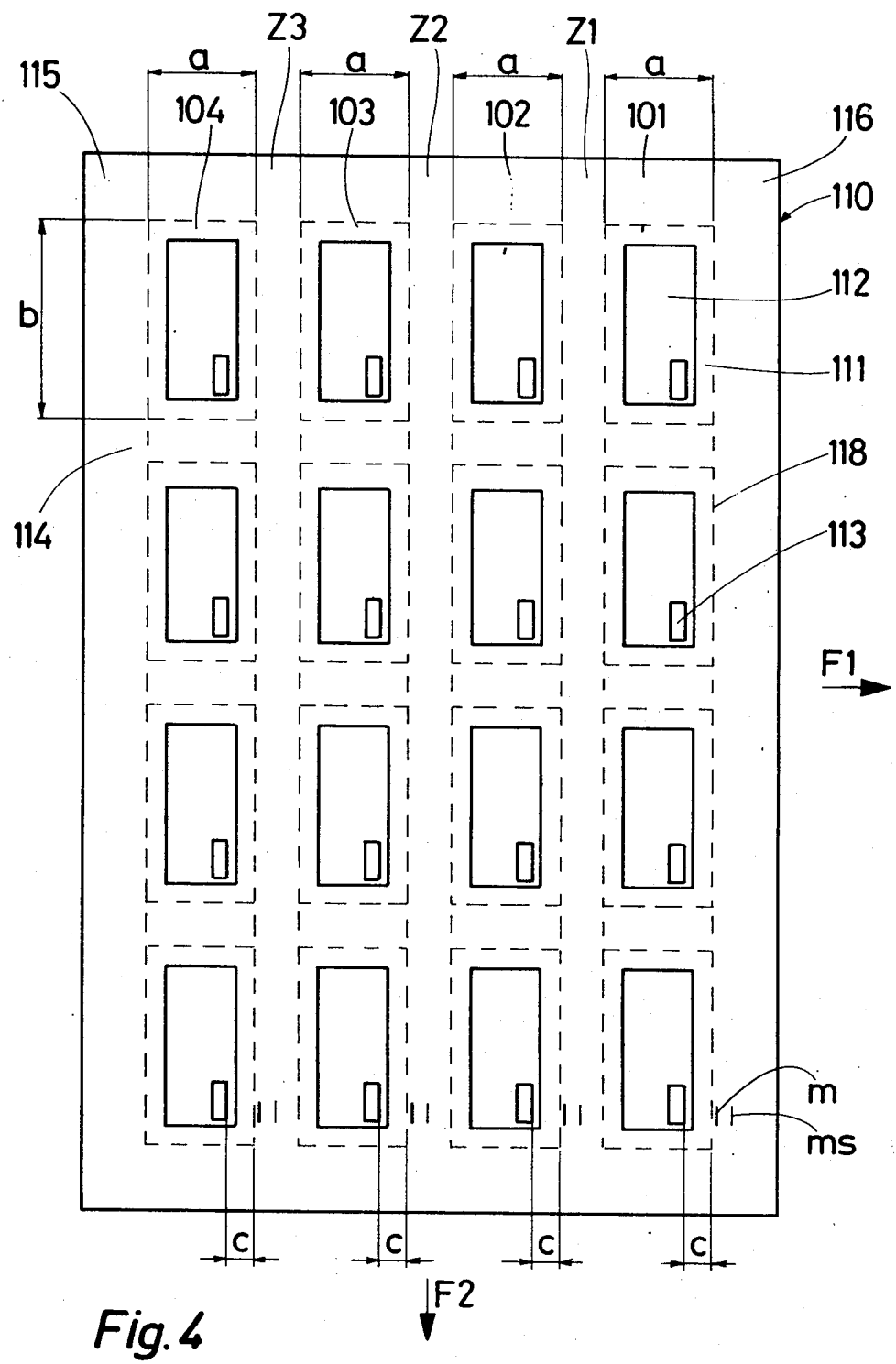
Figure 5:
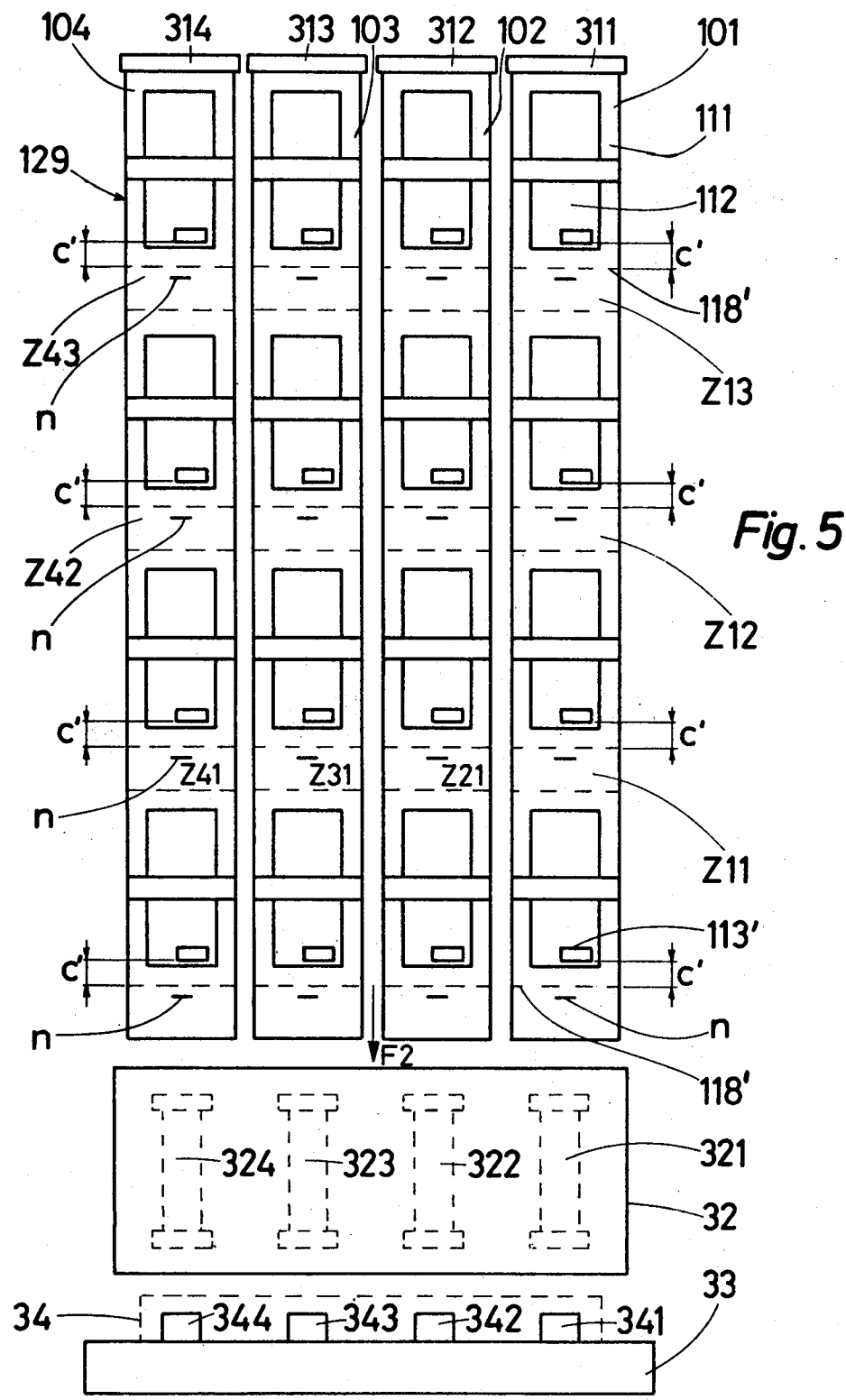

The invention is described in detail by way of example with reference to the drawings, in which:

FIG. 1 is a diagrammatic view of a security paper supported on a positioning stop, with the number to be read automatically, FIG. 2 is a diagrammatic view of the essential processing stations in the manufacture of security papers according to the present invention, FIG. 3 is a diagrammatic view of a printed sheet of security papers, which comprises 6×4=24 security paper impressions or individual notes and on which subsequent strip-cutting lines marked by cutting marks as well as the bundle-cutting lines are shown in broken line, FIG. 4 shows a sheet comprising 4×4=16 security paper impressions as a second example, which is processed with intermediate cuts, in which case the subsequent cutting lines are once again shown in broken line and the cutting marks defining the intermediate or waste cutting lines at the time of cutting strips are shown and FIG. 5 is, as a third example, the illustration of a feed control when cutting bundles, in the case of four layers of strips, which belong to a sheet with 4×4 security paper impressions processed with intermediate cuts and as in the example according to FIG. 5 and diagrammatically with the region including the bundle-cutting unit according to FIG. 2 together with the associated feed devices and reading units.

FIG. 1 shows diagrammatically a security paper 11 cut to format and having the dimensions a×b, with the printed image 12 surrounded by an unprinted light border, which in a lower corner comprises a number 13, which in the case of a bank-note consists of the serial number. This number 13 printed parallel to the lower broad side edge of the security paper 11 is intended to be read by an automatic number-reading unit for the purpose of a control and for checking authenticity. In the reading position, the lower edge of the security paper 11 bears as a reference edge 18 against a positioning stop 40. Appropriately, this positioning stop 40 is located with its contact face horizontal and forms a support, on which the vertically orientated security paper 11 is supported by its reference edge 18. In the reading position, the number 13 to be read is at a distance c from the positioning stop 40, i.e. from the reference edge 18. In order that the number is ascertained completely by the number-reading unit in the case of all security papers, this distance c must always be constant within very narrow limits, but which was hitherto not the case for the reasons described in the introduction.

FIG. 2 shows diagrammatically those processing stations which include the steps of the method according to the invention. It is assumed that the sheets of security papers have already been printed on both sides by offset printing and furthermore on one side by die-stamping. The last printing operation for sheets of security papers prepared in this way consists in that the other side of the sheet is also printed with a die-stamped image. The die-stamping unit 20 provided for this is shown diagrammatically in FIG. 2. The sheets of security papers, which lie ready at the inlet of the die-stamping unit 20 in the form of an inlet pile S1, travel in known manner individually in succession through the die-stamping unit 20 and at its outlet are assembled on an outlet pile S2. As shown, the individual finished printed sheets 10 each have twenty four security paper impressions or so called individual notes, which are arranged in the form of a matrix in six rows each with four security paper impressions. FIG. 3 is an enlargement of a sheet 10 of this type with its six rows of security papers 1 to 6, each of which comprise four security papers 11 with their security paper impression 12 and the number 13.

In known manner, the individual sheets are pulled by sheet grippers as they travel through the printing units, which grippers retain the front edge of the sheet. This edge of the sheet located at the front during travel through the printing units in the conveying direction $F_o$ is the so called gripper edge 14 (FIGS. 2 and 3) and the rows of security papers 1 to 6 are orientated parallel to this gripper edge 14, i.e. at right angles to the direction of travel of the sheets through the printing units. The three remaining edges of the sheets are designated by the reference numerals 15, 16 and 17.

The finished printed sheets 10 of the pile S2 are normally subjected to a visual quality control, in which sheets with faulty printing are eliminated. Then, for the purpose of numbering of the individual notes, the sheets 10 are supplied from an inlet pile S3 to a numbering machine 21, which in known manner comprises a numbering unit cylinder 21a with a corresponding number of numbering units 21b and a printing cylinder 21c cooperating with the latter. At the outlet, the numbered sheets are deposited on an outlet pile S4. Those numbering units 21b, which print the numbers 13 to be read subsequently on the security papers adjacent the edge 17 of the sheet (FIG. 3) are provided with blocks, which simultaneously print dash-like cutting marks m (FIG. 3) at a predetermined distance from the counters. If this distance is greater, the blocks are attached to the numbering unit supports. These cutting marks m define the subsequent cutting lines when cutting strips. Consequently, the critical distance c always remains constant, irrespective of which tolerances the digit position assumes relative to the printed image and to the edge of the sheet.

The numbered sheets are then supplied in the form of a pile one after the other to an automatic cutting machine. In this respect, according to FIG. 2, a pile of sheets S5 is firstly conveyed in the direction of the arrow along a conveying section 22 to the inlet of a cutting section 24 and brought into a defined initial position P1, in which all the sheets 10 of the pile are aligned with their gripper edges 14 against a stop 23. During the subsequent transportation of the pile along the cutting section 24 in the direction of arrow F1 to the strip-cutting unit 27 and during the step-wise feed within this strip-cutting unit 27, the gripper edges 14 form the rear edges of the sheets and thus the reference edge of the pile of sheets which is critical for cutting the strips, bearing on which edge in known manner are finger-like slide bars of an automatic feed device 26, in order to move the pile forwards.

Located laterally in the cutting section 24, in front of the strip-cutting unit 27, is a longitudinal cutting unit 25, against which the piles are stopped and in which trimming of the side edge takes place. In this case, only the edge 15 of the sheet is cut which comprises no cutting marks and at the time of subsequent cutting into bundles forms the rear edge of the layers of strips. Then, in the strip-cutting unit 27 constructed as a cross-cutting unit, first of all at the front side of the pile, trimming of the front edge 16 of the sheets 10 takes place (FIG. 3), then the pile is moved forwards stepwise and by respective cuts is divided into its six layers of strips 19, which correspond to the six rows of security papers 1 to 6 and finally on the rear side of the last layer of strips, the rear trimming of the gripper edge 14 is carried out. The waste paper produced at the time of trimming drops through a waste flap. When a pile has been cut, the following pile is automatically supplied.

Whereas in known automatic cutting machines, the lengths of the aforementioned feed operations are fixed or pre-programmed electronically as constant values and therefore layers of strips of the constant width a (FIG. 1) are always produced, according to the invention, the feed control is carried out by a reading unit 28 (FIG. 2) as a function of the cutting marks m read on the edge 17 of the sheet. These cutting marks m are read by the reading unit 28 immediately before the pile of sheets enters the strip-cutting unit 27, which unit 28 stops the pile of sheets in the cutting position provided.

The distance of the reading unit 28 from the cutters of the strip-cutting unit 27 and the positions of the cutting marks m relative to the cutting lines associated therewith are chosen so that, after the feed device 26 is switched off upon the response of the reading unit 28, on account of its inertia and the inertia of the feed mechanism, a pile of sheets still moves into the desired cutting position and comes to rest at this point. This stopping distance or deceleration distance of a pile is a definite quantity which can be reproduced exactly for similar piles.

The cutting marks m define all cuts carried out in the strip-cutting unit with the exception of the last cut, by which the gripper edge 14 located at the rear is cut off. The respective last feed step is therefore fixed.

The cutting marks m to be printed, which are easy to produce and their automatic reading by a reading unit 28 controlling the feed device 26 therefore allow a continuous exact control of the feed lengths when cutting strips so that the distance c shown in FIG. 3 and which is critical for subsequent automatic reading of the numbers remains constant. In this case, one puts up with the fact that the width of the layers of strips 19 or of the finished cut security papers 11 possibly varies a little from the actual desired value a and varies slightly from one layer of strips to another. Fluctuations of this type, which are shown in an exaggerated manner in FIG. 3, do not occur in practice. In any case, the advantage achieved is substantially greater than the possible drawback of slightly different widths of security papers.

The further processing of the layers of strips 19, which in the considered example according to FIG. 3 no longer belongs to the present invention, will be described briefly with reference to the example of FIG. 5.

Located after the strip-cutting unit 27 is a banding station 29 with a number of individual banding devices corresponding to the number of notes per strip, i.e. in the example in question four banding devices, which are operated simultaneously at the time of each working operation, so that each layer of strips 19 is simultaneously surrounded at the four security paper or note positions with a pre-glued band 129.

The finished bound layers of strips 19 are first of all removed from the banding station 29 in the direction of the arrow, in the longitudinal direction of the strips and then moved along the conveying section 35, at right angles to the longitudinal direction of the strips, by means of a feed device 30 to the inlet of the cutting section 36, on which an automatic bundle-cutting unit 33, constructed as a cross-cutting unit, is installed. At the inlet of this cutting section 36, all six layers of strips 19 belonging to one and the same pile of sheets S5 are assembled in a definite initial position P2, in which the edges cut in the longitudinal cutting unit 25 are aligned by bearing against a slide 31, which belongs to the feed device 32. All six layers of strips 19, which, as shown in FIG. 2, are arranged at a short distance apart, are then moved together by means of the feed device 32 in the direction of arrow F2 to the bundle-cutting unit 33, in which case they are guided in grooves. In the bundle-cutting unit 33, first of all the front edge of all six layers of strips 19 corresponding to the side edge 17 of the sheet (FIG. 3) is trimmed and then, with step-wise feeding, all six layers of strips 19 are cut simultaneously by three successive cuts into individual bundles 38 of security papers, which are already bound and in which the security papers have their finished format.

Control of the feed can be carried out particularly accurately and simply by commercially available feed devices, which are known by the name of linear amplifiers. These linear amplifiers have a hydraulic cylinder/piston system, in which case the metered supply of pressure medium to the hydraulic cylinder takes place by means of a stepping motor, which at the time of each revolution opens the pressure medium inlet valve for a short time. Consequently, upon one revolution of the stepping motor, an exactly metered, small quantity of pressure medium is supplied to the cylinder so that the piston carries out a feed of approximately 0.1 mm. A hydraulically controlled feed of this type also operates with a sufficiently short response time.

The aforedescribed processing of sheets of security papers to form bound bundles of security papers and the cutting and binding machines used for this purpose are known and described for example in Swiss Patent Specification CH No. 612 639 or American Patent Specification U.S. Pat. No. 4,283,902 of the same applicant, also in the former Swiss Patent Application No. 6 740/81 of the same applicant.

The bound bundles 38 cut to format are advanced to a conveying section 37 and pass to further processing stations, which are not of interest here, in which packs of bundles with consecutively numbered security papers of a certain series are formed and then these packs of bundles are bound and packed. This further processing is the subject of Swiss Patent Specification CH No. 577 426 or American Patent Specification U.S. Pat. Nos. 3,939,621 and 4,045,944 of the same applicant.

The aforedescribed example related to the cutting of sheets by individual cuts, which has the result that on account of the possibly varied feed steps, the width of the security papers produced is not constant, but varies to a small extent. However, this slightly different format of security paper is generally not of importance and in most cases is acceptable.

However, according to the method of the invention, security papers of a constant format may also be readily produced, if one works with intermediate cuts in manner known per se. An embodiment relating to this is described with reference to FIG. 4. FIG. 4 shows a sheet 110 of security papers with sixteen security papers 111, which are arranged in four rows of security papers 101 to 104 each with four individual notes and which comprise security paper impressions 112 with the numbers 113.

The subsequent cutting lines are shown by dashes, in which case the cutting lines producing the constant distance c with respect to the position of the numbers 113, which lines define the reference edges 118 are once more determined by printed cutting marks m, which on this occasion are located on the intermediate strips Z1, Z2 and Z3. In this case, the format of all security papers 111 always has the same size and has the dimension a×b. For this purpose, the widths of the intermediate strips Z1, Z2 and Z3 located between adjacent rows of security papers 101 to 104 possibly vary, which strips are subsequently cut off as waste strips.

By means of an apparatus illustrated in FIG. 2, after the side edge 115 was trimmed in the cutting unit 25, first of all the front edge 116 is cut off in the strip-cutting unit 27, in which case the advance into this cutting position is controlled by reading the first printed mark m by the reading unit 28. The length a of the following feed step into the cutting position necessary for the first strip cut is pre-programmed. The feed into the following cutting position, in which the intermediate strip Z1 is cut, is once more controlled by the reading unit 28 by reading the second printed mark m. A feed step of the length a follows the latter and so on.

Instead of individual cutting marks, double marks may also be provided, which, as shown in FIG. 4, consist of two dash-like marks $m_s$ and m located at a slight distance apart. The arrangement is then such that on reading the first mark $m_s$, the normal feed speed of the pile of sheets is reduced to a creeping movement and only on reading the second mark m is the feed device 26 stopped. The preceding slowing-down of the pile of sheets before it stops in this way increases the arrival accuracy in the cutting position and is thus suitable if, as described, the piles of sheets are moved forwards by means of slides in the normal manner, which slides bear solely on the rear edge of the piles, in the example in question on the gripper edge 114.

FIG. 5 shows the feed control for achieving defined reference edges when cutting bundles, in the case of a sheet according to FIG. 4, which is processed with intermediate cuts and has already been cut into its four layers of strips 119 corresponding to the rows of security papers 101 to 104. It is assumed that on this occasion the number 113' is parallel to the narrow side of a security paper 111 and for this purpose one wishes to have parallel reference edges 118', which are only produced in the bundle-cutting unit 33. It is also assumed that the tolerances from one layer of strips to another are so considerable that it is desirable to control the feed of each individual layer of strips 119 individually. Therefore, in this case, in the numbering machine, cutting marks n associated with each individual security paper 111 are printed on the intermediate strips between adjacent security papers 111 of each row of security papers. These intermediate strips are referred to by the reference numerals Z11 to Z13, Z21 etc., Z31 etc., and Z41 to Z43.

In contrast to the earlier examples according to FIGS. 1 to 4, the feed device 32 consists, as shown diagrammatically in FIG. 5, of a number of separate, independently controllable feed devices 321 to 324 corresponding to the number of layers of strip per pile, whereof each device with its associated slide 311 to 314 moves one of the layers of strips 119, which correspond to the rows of security papers 101 to 104, individually in the direction F2.

In order to recognize the cutting marks n, a reading unit system 34 with the four individual reading units 341 to 344 is installed in front of the bundle-cutting unit 33, which units scan the individual layers of strips 119 and control the respective feed devices 321 to 324 individually. The advance from the aligned initial position P2 into the first cutting position, in which the front edges of the layers of strips 119 are cut off, is controlled separately for each layer of strips by the reading units 341 to 344 on reading the cutting marks n respectively located on the front edge of each layer of strips. Only when all four layers of strips 119 have assumed their desired cutting position, is the front edge trimmed simultaneously in the bundle-cutting unit 33. After trimming, each of the feed devices 321 to 324 carries out a fixed, programmed feed step of the length b, whereupon the foremost bundles of security papers of each layer of strips are cut off. The next feed is again controlled by the reading units, individually for each layer of strips, on reading the respective marks n on the intermediate strips Z11, Z21, Z31 and Z41, whereupon these layers of strips are cut jointly. This cut is then followed by a fixed, programmed feed step of the length b, etc. All joint cuts naturally take place solely when all the layers of strips have completed their individual feed steps and have come to rest in their desired cutting position. In this way one obtains security papers, in which both the critical distance c' as well as the security paper format are constant.

The aforedescribed processing of sheets of security papers with the assistance of intermediate cuts generally presupposes that the waste strips produced are at least 2 mm wide, in order to ensure troublefree cuts.

Naturally, the feed control when cutting bundles may take place as a function of cutting marks n for all layers of strips together by a single feed device and with only one reading unit for reading the cutting marks n printed solely on one row of security papers, if tolerances from one layer of strips to another are of no importance.

The invention is not limited to the embodiments described, but may have many variations. Thus, if the side edge 117 of the sheets, as in the example according to FIG. 4, has no cutting marks for controlling the feed when cutting strips, both opposite side edges 115 and 117 of the pile of sheets are cut off simultaneously on the cutting section 24 before carrying out the strip cuts. Furthermore, the layers of strips belonging to one pile of sheets may be divided in succession into bundles of security papers.

What is claimed is:

1. Method for the manufacture of freshly printed, numbered security papers cut to format, according to which sheets of security papers with security paper impressions arranged in the form of a matrix are printed, numbered and placed one on the other to form piles and with a step-wise feed, the piles of sheets formed in this way are cut automatically first of all into layers of strips and then into bundles of security papers, in which case the printed number or in the case of numbers printed at several points on a security paper, a number always located at the same position of the security papers is intended to be read later for control purposes automatically by a number-reading unit, whilst the security paper bears against a positioning stop by a reference edge adjacent this number, characterised in that the position of the cutting lines determining the reference edges of all security papers is defined by cutting marks, which are applied during numbering of the sheets together with the number, at a predetermined constant distance from this number, so that these cutting lines always have the same spacing with respect to the position of the number of the respective security paper and that the length of the feed movements, which provide guidance into the cutting positions corresponding to these cutting lines, is controlled automatically as a function of the cutting marks read by a reading unit.

2. Method according to claim 1, characterised in that the reference edges are produced when cutting strips and that the cutting marks are applied to a side edge of the sheets arranged parallel to the feed direction of the pile of sheets when cutting strips, which side edge is cut off at the time of subsequent trimming.

3. Method according to claim 1, characterised in that one works with intermediate cuts and the cutting marks are applied to the subsequent waste strips.

4. Method according to claim 3, characterised in that the reference edges are produced when cutting bundles.

5. Method according to claim 4, in which all the layers of strips belonging to one and the same pile of sheets are assembled lying one beside the other in their initial position, fed jointly to the bundle-cutting unit and at this point cut simultaneously in steps into bundles of security papers, characterised in that the feed length to the bundle-cutting unit and the individual feed steps during the cutting of bundles for each individual layer of strips can be controlled separately as a function of the cutting marks read individually on all layers of strips.

6. Method according to claim 5, characterised in that as cutting marks, two individual marks are respectively applied per cutting line and that reading of the first individual mark in the feed direction brings about a reduction of the normal feed speed to a creeping movement and reading of the second individual mark stops the feed movement.

7. Apparatus for carrying out the method according to claim 1, with a numbering machine for the sheets and with strip and bundle-cutting units and with feed devices for the piles of sheets and layers of strips operating automatically and associated with these cutting units, characterised in that the numbering machine is designed to print cutting marks defining the reference edges and that provided on the cutting unit, namely strip-cutting unit or bundle-cutting unit, in which the reference edges are produced, is at least one reading unit which responds to the cutting marks and controls the feed movements of the respective feed device.

8. Apparatus according to claim 7, characterised in that blocks for printing the cutting marks are attached to the numbering units or to the supports for the numbering units of the numbering machine.

9. Apparatus according to claim 7 with a bundle-cutting unit, to which all layers of strips belonging to one and the same pile of sheets are supplied jointly by moving in the longitudinal direction and in which these layers of strips are cut simultaneously into security paper bundles, characterised in that associated with all the afore-mentioned layers of strips is an individual reading unit and an individual feed device, which can be controlled separately from the others.

* * * * *